United States Patent
Hu et al.

(10) Patent No.: US 11,307,645 B2
(45) Date of Patent: Apr. 19, 2022

(54) INSTRUCTION UPDATES VIA SIDE CHANNELS

(71) Applicant: HEWLETT-PACKARD DEVELOPMENT COMPANY, L.P., Spring, TX (US)

(72) Inventors: Chun Yen Hu, Taipei (TW); Hengchang Hsu, Taipei (TW); Roger D Benson, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 19 days.

(21) Appl. No.: 16/758,133

(22) PCT Filed: Feb. 1, 2018

(86) PCT No.: PCT/US2018/016408
§ 371 (c)(1),
(2) Date: Apr. 22, 2020

(87) PCT Pub. No.: WO2019/152037
PCT Pub. Date: Aug. 8, 2019

(65) Prior Publication Data
US 2021/0365103 A1    Nov. 25, 2021

(51) Int. Cl.
*G06F 1/3296* (2019.01)
*G06F 13/10* (2006.01)
*G06F 13/40* (2006.01)

(52) U.S. Cl.
CPC .......... *G06F 1/3296* (2013.01); *G06F 13/102* (2013.01); *G06F 13/4068* (2013.01)

(58) Field of Classification Search
CPC ........ Y02D 10/00; Y02D 30/50; Y02D 30/70; G06F 1/3203; G06F 1/3243;
(Continued)

(56) References Cited

U.S. PATENT DOCUMENTS

| | | | | |
|---|---|---|---|---|
| 5,729,767 A | * | 3/1998 | Jones | G06F 11/2236 714/E11.166 |
| 2003/0014677 A1 | * | 1/2003 | Howard | G06F 1/3253 713/323 |

(Continued)

FOREIGN PATENT DOCUMENTS

CA    2668226 A1    12/2010

OTHER PUBLICATIONS

How to Update a Server Firmware From the iDRAXC? Remote Update, https://www.dell.com/support/article/us/en/04/sln305431/how-to-update-a-server-firmware-from-the-idrac-remote-update2lapo=en.

*Primary Examiner* — Faisal M Zaman
(74) *Attorney, Agent, or Firm* — Perry + Currier Inc.

(57) ABSTRACT

An example device includes a data port to provide a data channel to a host and a processor coupled to the data port. The processor includes an operational mode and a low-power mode in which the processor is to perform fewer operations than in the operational mode. The processor is to execute instructions in the operational mode and to update the instructions with updated instructions received via the data channel in the operational mode. The device further includes a side channel to receive a signal from the host to trigger the processor to switch from the low-power mode to the operational mode and to initiate update of the instructions with the updated instructions.

15 Claims, 6 Drawing Sheets

(58) Field of Classification Search
CPC .... G06F 1/3287; G06F 1/3296; G06F 1/3206; G06F 1/324; G06F 9/4418; G06F 1/26; G06F 1/3253; G06F 1/3278; G06F 13/102; G06F 13/4068; G06F 8/65
USPC ....... 713/300, 323, 324, 310, 320, 321, 322, 713/330
See application file for complete search history.

(56) References Cited

U.S. PATENT DOCUMENTS

| | | | | |
|---|---|---|---|---|
| 2004/0083396 | A1* | 4/2004 | Perahia | G06F 1/3221 713/300 |
| 2004/0145580 | A1* | 7/2004 | Perlman | G09G 5/003 345/204 |
| 2006/0053318 | A1* | 3/2006 | One | G06F 1/266 713/300 |
| 2006/0057960 | A1* | 3/2006 | Tran | H04W 12/06 455/100 |
| 2006/0253638 | A1 | 11/2006 | Oliver et al. | |
| 2007/0140199 | A1 | 6/2007 | Zhao | |
| 2009/0327764 | A1* | 12/2009 | Brey | G06F 1/3203 713/300 |
| 2010/0241889 | A1* | 9/2010 | Fu | G06F 1/3209 710/16 |
| 2011/0273839 | A1 | 11/2011 | Villegas | |
| 2011/0296216 | A1* | 12/2011 | Looi | G06F 1/3287 713/323 |
| 2013/0305066 | A1* | 11/2013 | Mullins | G06F 1/3203 713/310 |
| 2013/0328878 | A1* | 12/2013 | Stahl | G09G 5/005 345/1.3 |
| 2014/0095911 | A1* | 4/2014 | Rosenzweig | G06F 1/3296 713/323 |
| 2015/0096013 | A1 | 4/2015 | Ozolins et al. | |
| 2016/0011887 | A1 | 1/2016 | Chung et al. | |
| 2016/0231804 | A1 | 8/2016 | Bulusu | |
| 2016/0328202 | A1 | 11/2016 | Ritter | |
| 2017/0177046 | A1* | 6/2017 | Garg | G06F 1/26 |
| 2017/0361463 | A1* | 12/2017 | Geraghty | G05D 1/028 |
| 2018/0027330 | A1* | 1/2018 | Rand | H01R 29/00 381/309 |
| 2018/0196681 | A1* | 7/2018 | Amarilio | G06F 13/364 |
| 2019/0162782 | A1* | 5/2019 | Shanbhogue | G01R 31/3187 |

* cited by examiner

INSTRUCTION UPDATES VIA SIDE CHANNELS

BACKGROUND

Accessory devices are often used with computers to add functionality not normally provided native to the computer. Examples of accessory devices include user-input devices, audio devices, hubs, external storage devices, communications devices, and similar. Accessory devices often have low-power modes, in which operations are restricted to save power. For example, a DisplayPort™ hub may enter a low-power mode when no monitor is connected, as such a hub is not intended to be used without a monitor.

DETAILED DESCRIPTION

It may be the case that an accessory device cannot have its instructions, also termed firmware, updated while in a low-power mode. Further, an accessory device may remain in a low-power mode despite a requirement to update its instructions. For example, a DisplayPort hub may remain in a low-power mode when a monitor or other display device is not connected, despite the hub being connected to an operational host computer. A normal data connection of the accessory device to a host computer may not support triggering the exit of the low-power mode, as it may have assumed that a user would attend to the accessory device when its instructions are to be updated. This, however, is not always the case, particularly when a remote update is to be performed.

An accessory device may be triggered to exit a low-power mode when instructions are to be updated at the device. A side channel may be provided to the accessory device. A signal may be sent to the accessory device over the side channel to trigger the accessory device to exit a low-power mode and enter an operational mode in which the instructions, or firmware, can be updated. The side channel may connect the accessory device a host, such as the same host that provides a normal data connection, and the host may be used to remotely update the accessory device.

Figure 1:
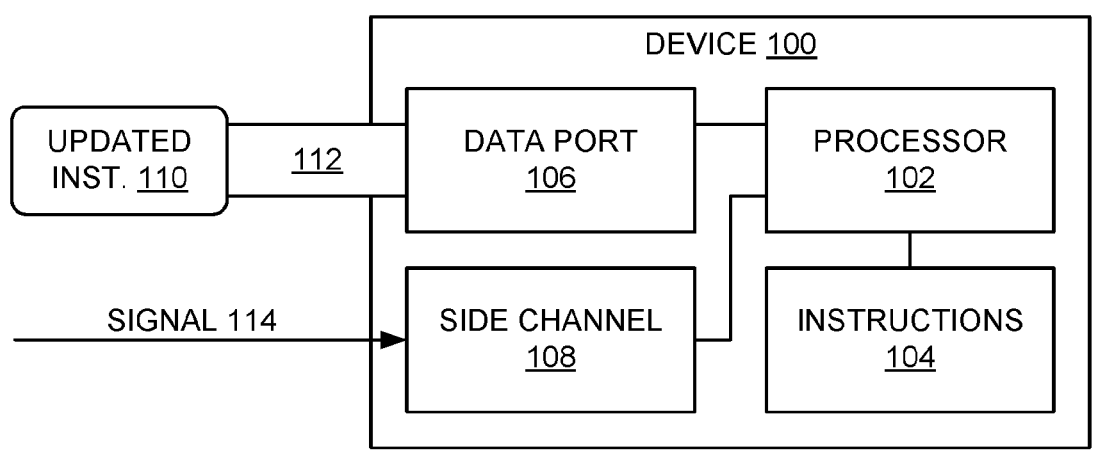
FIG. 1 is a block diagram of an example device that has instructions updated via triggering through an example side channel.

FIG. 1 shows an example device 100. The device 100 may be an accessory device, such as a display device hub. A display device hub may be a DisplayPort™ hub that may comply with a Video Electronics Standards Association (VESA™) guideline, specification, or standard. Other examples of accessory devices include user-input devices, such as mice, audio devices, data hubs, such as Universal Serial Bus (USB™) hubs, external storage devices, communications devices, and the like.

The device 100 includes a processor 102, instructions 104, a data port 106, and a side channel 108.

The processor 102 is coupled to the data port 106 and the side channel 108. The processor 102 may include a central processing unit (CPU), a microcontroller, a microprocessor, a processing core, a field-programmable gate array (FPGA), or similar device capable of executing the instructions 104. The processor 102 may cooperate with memory to execute the instructions 104. Memory may include a non-transitory machine-readable storage medium that is encoded with the instructions 104. Memory may include electrically-erasable programmable read-only memory (EEPROM), flash memory, and similar devices to store the instructions 104 and receive updates to the instructions 104.

The processor 102 includes an operational mode and a low-power mode. The operational mode may be a mode of normal operation. In the example of a display device hub, the operational mode may include the processor 102 executing instructions 104 to communicate video data among a host computer and a plurality of display devices. The low-power mode may include the processor 102 performing fewer operations than in the operational mode. In some examples, the processor 102 is dormant in the low-power mode and performs no operations. In other examples, the processor 102 performs minimal operations, such as an operation to detect a connection to the device 100 in the low-power mode. These examples of low-power modes may be to reduce power consumption by the device 100. For example, in the example of a display device hub, the low-power mode may include the processor 102 not executing instructions 104 to communicate video data among the host computer and the plurality of display devices. The low-power mode may put other components of the device 100 into a low-power state.

The instructions 104 implement an operation of the device 100. When the device 100 is implemented as an accessory device, an operation implemented by the instructions 104 may support a host computer to which the accessory device is connected. The instructions 104 are updatable. The instructions 104 may be updated by updated instructions 110 received via the data port 106. Examples of updating include overwriting instructions, appending instructions, patching instructions, deleting instructions, and similar. The instructions 104 may be termed firmware.

The data port 106 provides a data channel 112 between the device 100 and a host computer. The data channel 112 may be to facilitate operation of the device 100. For example, in the example of a display device hub, the data port 106 may receive video data, such as still-image data and moving-image data, from the host computer. The data port 106 may include a connector or a receptacle, such as a DisplayPort receptacle. The data channel 112 may include a video data bus to communicate video data and an auxiliary channel. In a DisplayPort example, the video data bus includes lanes and the auxiliary channel may be termed an AUX channel and may be to communicate data related to available rendering capabilities, content protection, settings, and similar.

The side channel 108 is to connect to the host computer to receive a trigger signal 114 from the host computer. The signal 114 is to trigger the processor 102 to switch from the low-power mode to the operational mode and to initiate update of the instructions 104 with the updated instructions 110. Triggering the processor 102 to exit the low-power mode may raise the processor 102 to an operational state where update of the instructions 104 is possible. The instructions 104 may implement an update process in which the signal 114 triggers the instructions 104 as executed by the processor 102 to update the instructions 104. Updated instructions may be received from the host computer connected to the data port 106. For example, the updated instructions 110 may be received via the AUX channel of a data channel 112 provided at the data port 106.

The side channel 108 may include a USB connection, such as a USB port, a USB receptacle, a USB connector, a USB cable, or similar. The side channel 108 may include a microcontroller to receive the signal 114 and trigger the processor 102 to exit the low-power mode. The microcontroller may be to convert a signal provided by the host computer into a signal understood by the processor 102. For example, the microcontroller may be to convert an application signal provided by the host computer over USB into a General-Purpose Input/Output (GPIO) or Inter-Integrated Circuit (I2C) signal understandable by the processor 102.

As shown by the DisplayPort and USB examples, the data port 106 and the side channel 108 may include separate conductors at separate physical ports at the device 100.

After update of the instructions 104, the device 100 may be returned to the low-power mode. This may include providing a second signal to the side channel to trigger the device 100 to enter the low-power mode. In other examples, the signal 114 that triggers the exit of the low-power mode is required to be continuously or regularly transmitted to maintain the operational mode, and removal of the signal 114 causes the low-power mode to be reentered.

Figure 2:
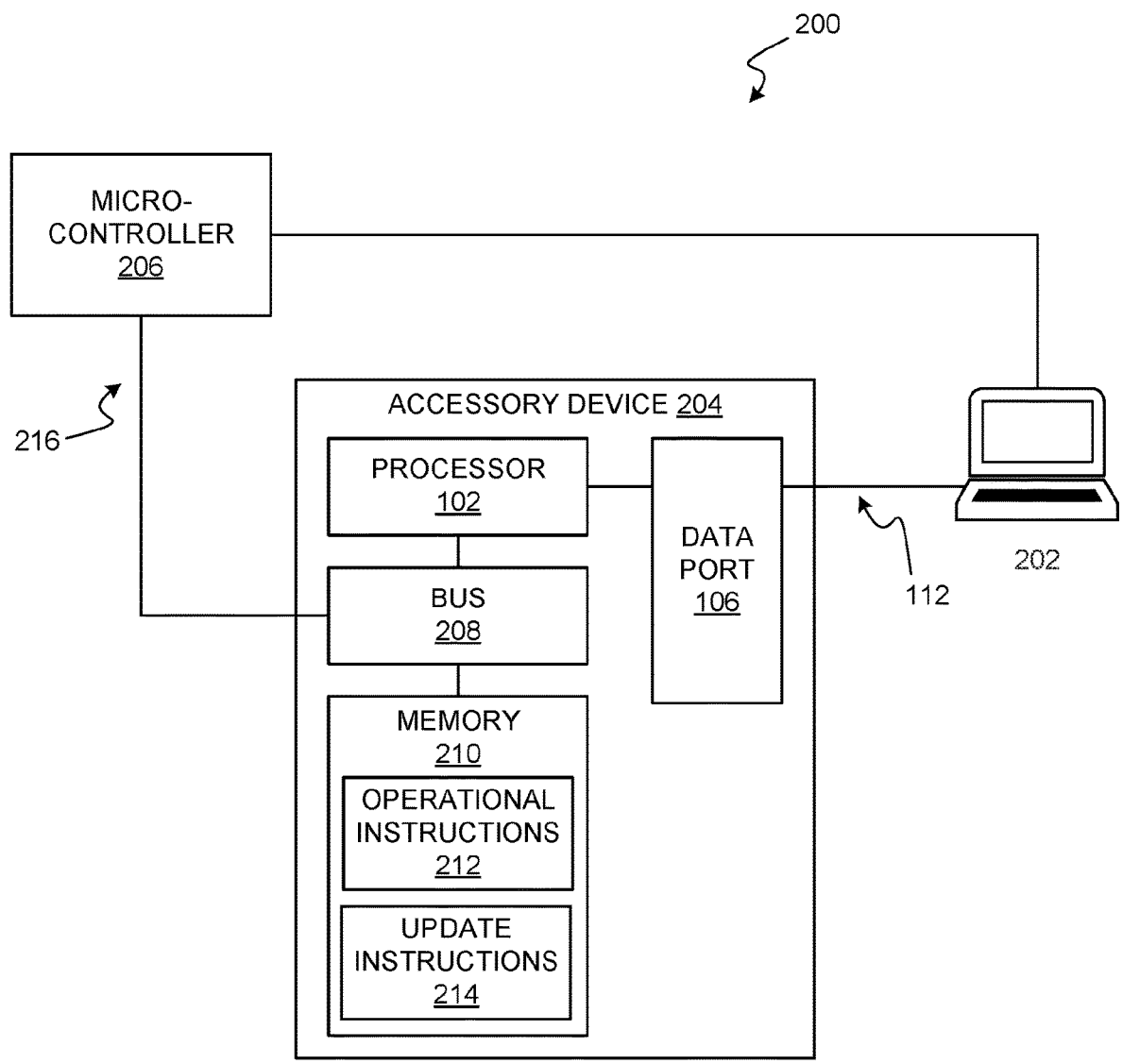
FIG. 2 is a block diagram of an example system including an example accessory device that has instructions updated via triggering through an example side channel.

FIG. 2 shows an example system 200. The system 200 includes a host computer device 202, an accessory device 204, and a microcontroller 206.

The computer device 202 may be a notebook computer, a server, a tablet computer, or similar. The computer device 202 may include instructions to initiate an update of instructions at the accessory device 204. The computer device 202 may further deliver updated instructions to the accessory device 204. Initiating update may include the computer device triggering the accessory device to exit a low-power mode. The computer device 202 may perform this function as part of a remote update process, which may include another computer, such as a remote server, connected to the computer device 202 via a computer network.

The accessory device 204 may be any kind of accessory device, such as those described elsewhere herein. The accessory device 204 may include components of any of the other devices discussed herein, such as the device 100. Like reference numerals denote like components, and description of like components will not be repeated here for sake of clarity.

The accessory device 204 may include a processor 102, a data port 106, a bus 208, and memory 210. The bus 208 may be an I2C bus, or similar, to communicate data among components of the accessory device 204. The memory 210 may be EEPROM, flash memory, or similar.

The memory 210 may store instructions, which may be termed firmware. The instructions may include operational instructions 212 and update instructions 214. The operational instructions 212 may implement an operation or function of the accessory device 204, such as communicate or process data received or transmitted via the data port 106. The update instructions 214 may be to update the operational instructions 212 to update an operational characteristic of the accessory device 204, such as to add a new feature, support a new data type or protocol, correct undesirable behavior, or similar. The update instructions 214 may be to provide the processor 102 with access to the memory 210.

The computer device 202 may connect to the accessory device 204 through a data channel 112 provided by the data port 106 at the accessory device 204 and a complementary port at the computer device 202.

The computer device 202 may further connect to the accessory device 204 via a side channel 216. The microcontroller 206 may be included in the side channel 216. The side channel 216 may further include a conductor that connects the bus 208 of the accessory device 204 to a complementary connection at the computer device 202.

The processor 102 is to operate in a low-power mode and an operational mode. In the operational mode, the operational instructions 212 may be executed by the processor 102 to realize an operation of the accessory device 204 and the update instructions 214 may be executed by the processor 102 to perform an update with any updated instructions received via the data port 106. In the low-power mode, the processor 102 does not execute the operational instructions 212 or executes a subset of the operational instructions 212. Further, in the low-power mode, the processor 102 does not execute the update instructions 214. In the low-power mode, the operational instructions 212 or firmware of the accessory device 204 are immutable, as the update instructions 212 are not executed so as to save energy.

The processor 102 may switch between the operational mode and the low-power mode based on mode-switching logic determined by the function of the accessory device 204. In the example of a display device hub, the processor 102 may switch from the operational mode to the low-power mode if no display device is connected. The mode-switching logic may be implemented at the hardware level.

The processor 102 is responsive to a signal at the bus 208 to switch from the low-power mode to the operational mode, irrespective of the mode-switching logic. That is, the signal at the bus 208 triggers the processor 102 to exit the low-power mode and enter a mode that allows the update instructions 214 to be executed. Hence, any updated instructions provided to the accessory device 204, for example via the data port 106, may be used to update the instructions 212.

The microcontroller 206 may be to convert a signal provided by the host computer device 202 into a signal compatible to the bus 208 and discernable the processor 102 as a signal to trigger the processor 102 to exit the low-power mode. The microcontroller 206 may be provided in a dock for use with the computer device 202. In other examples, the microcontroller 206 may be provided at the computer device 202 or at the accessory device 402.

Figure 3:
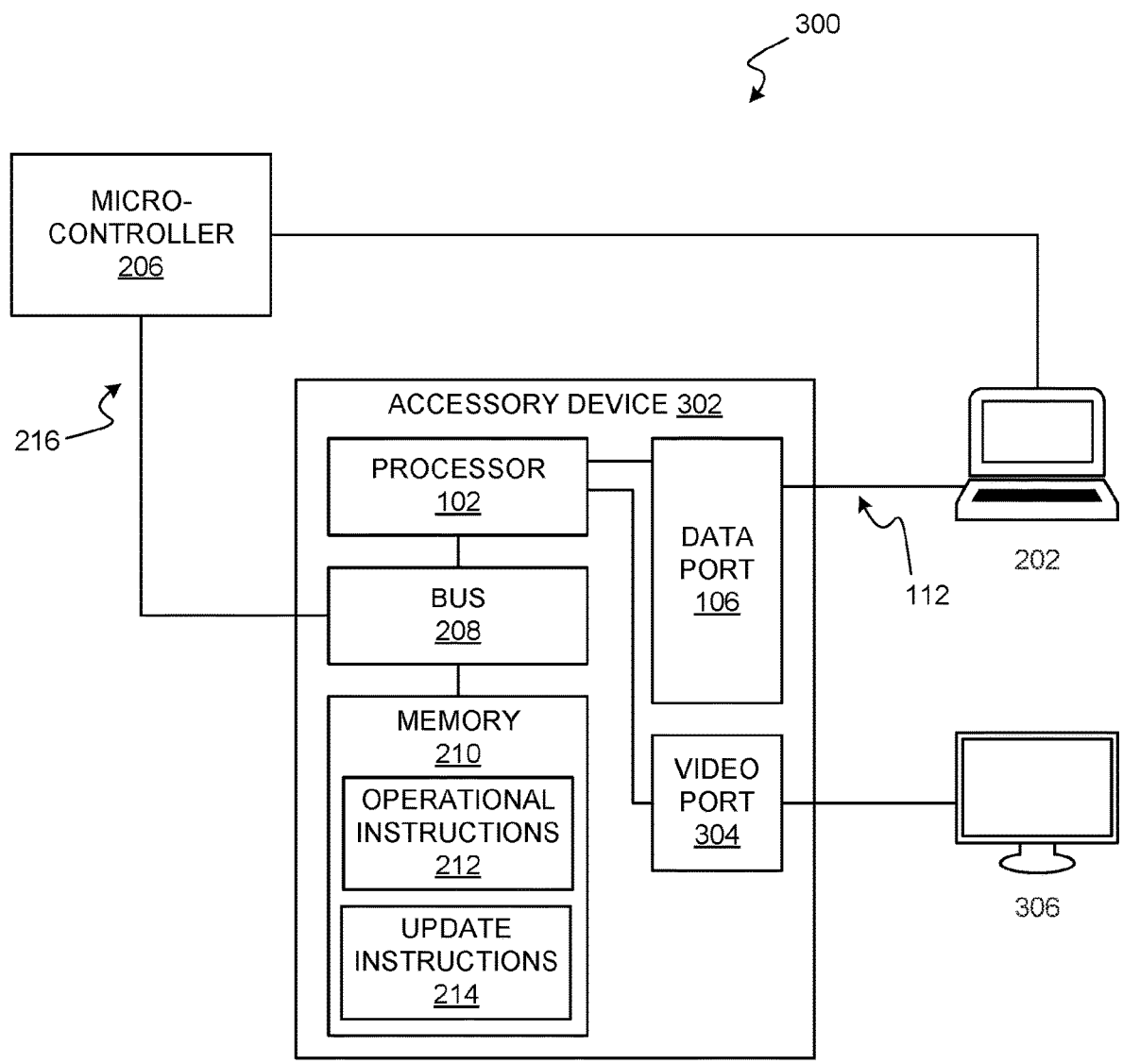
FIG. 3 is a block diagram of an example system including an example video accessory device that has instructions updated via triggering through an example side channel.

FIG. 3 shows an example system 300. The system 300 includes a host computer device 202, an accessory device 302, and a microcontroller 206. Like reference numerals denote like components, and description of like components will not be repeated here for sake of clarity. The other systems discussed herein, such as the system 200, may be referenced for such description.

The accessory device 302 may be a video accessory device, such as a display device adaptor, a DisplayPort adaptor, or similar. The accessory device 302 may include a processor 102, a data port 106, a bus 208, memory 210, and a video port 304 coupled to the processor 102.

The video port 304 is to connect to a display device 306, such as a monitor, projector, or the like. The video port 304 may be considered part of the data channel provided by the data port 106.

The processor 102 is to control data communication between the data port 106 and the video port 304, which may be facilitated by the operational instructions 212 stored in the memory 210. The processor 102 is responsive to mode-switching logic to switch to the low-power mode when the video port 304 is not connected to the display device 306. The processor 102 is responsive to a signal at the bus 208 to switch from the low-power mode to the operational mode, irrespective of any mode-switching logic, so that operational instructions 212 in the memory 210 may be updated by the host computer device 202 without the need for the display device 306 to be connected.

Figure 4:
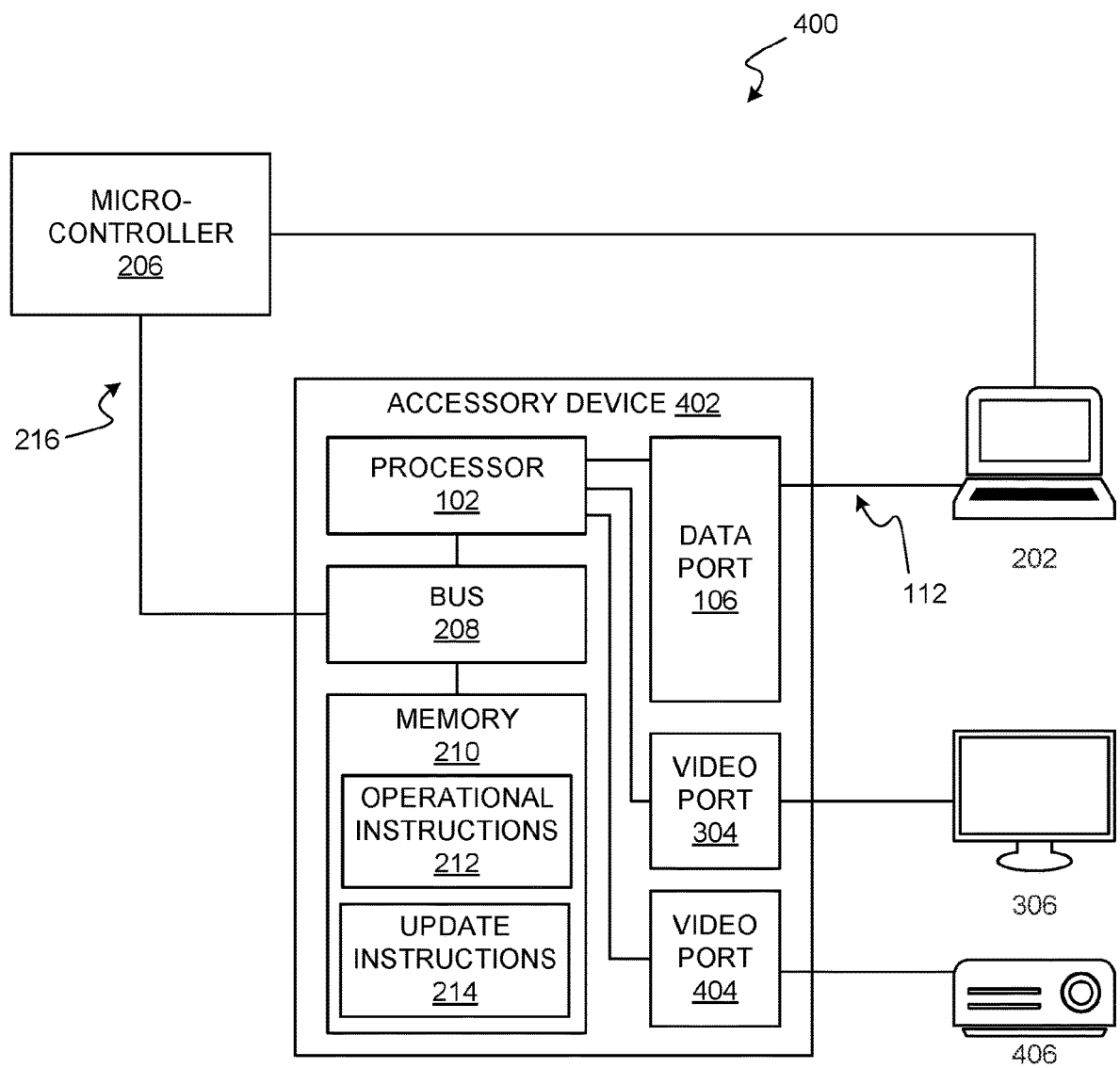
FIG. 4 is a block diagram of an example system including an example multi-output video accessory device that has instructions updated via triggering through an example side channel.

FIG. 4 shows an example system 400. The system 400 includes a host computer device 202, an accessory device 402, and a microcontroller 206. Like reference numerals denote like components, and description of like components will not be repeated here for sake of clarity. The other systems discussed herein, such as the system 300, may be referenced for such description.

The accessory device 402 may be a multi-output video accessory device, such as a display device hub, a DisplayPort hub, or similar. The accessory device 402 may include a processor 102, a data port 106, a bus 208, memory 210, and a plurality of video ports 304, 404 coupled to the processor 102.

Each of the plurality of video ports 304, 404 is to connect to a display device 306, 406, such as a monitor, projector, or the like.

The processor 102 is to control data communication between the data port 106 and the video ports 304, 404, which may be facilitated by the operational instructions 212 stored in the memory 210. The processor 102 is responsive to mode-switching logic to switch to the low-power mode when none of the video ports 304, 404 is connected to a display device 306, 406. The processor 102 is responsive to a signal at the bus 208 to switch from the low-power mode to the operational mode, irrespective of any mode-switching logic, so that operational instructions 212 in the memory 210 may be updated by the host computer device 202 without the need for a display device 306, 406 to be connected.

Figure 5:
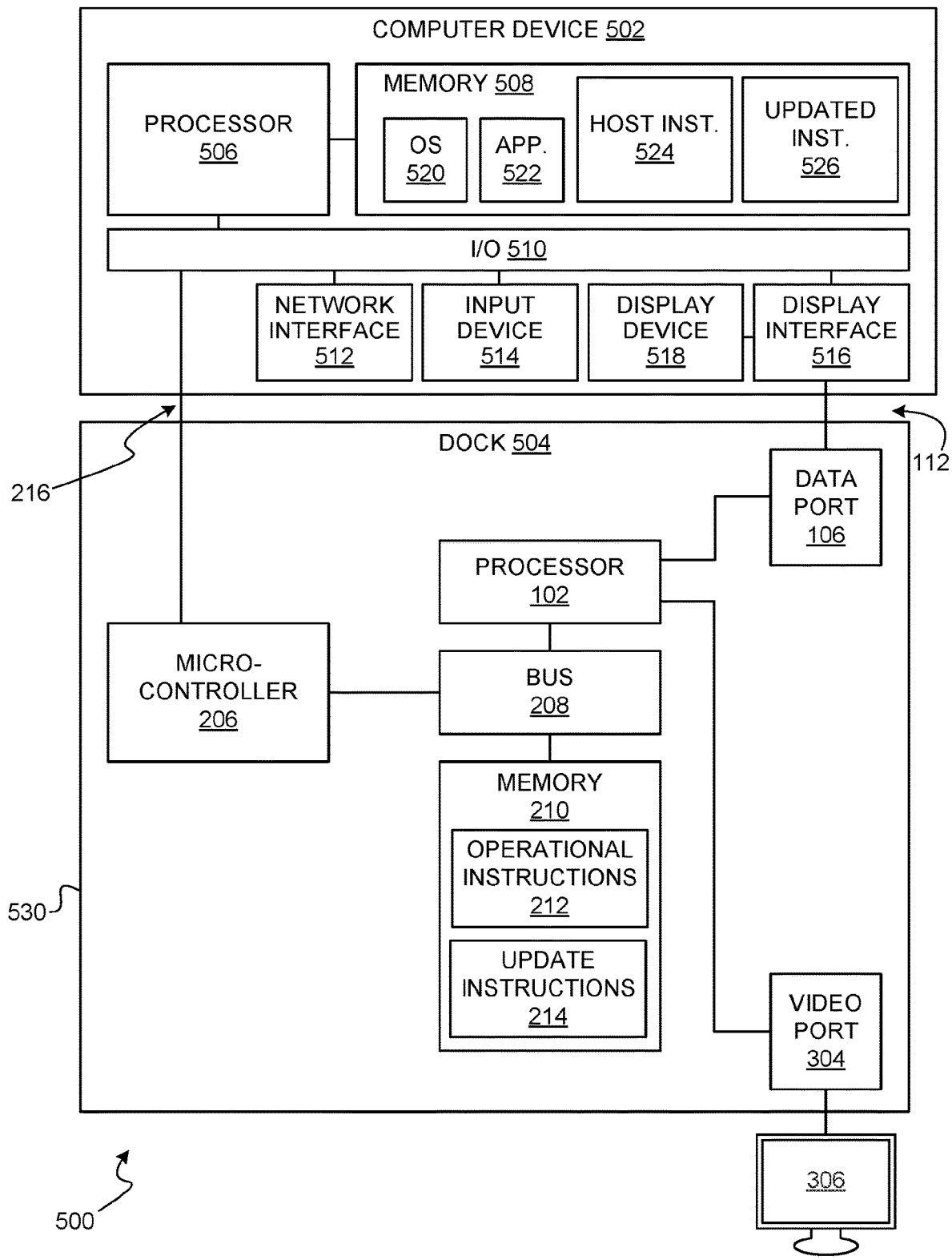
FIG. 5 is a block diagram of an example system including an example dock that has instructions updated via triggering through an example side channel.

FIG. 5 shows an example system 500. The system 500 includes a host computer device 502, a dock 504 or other accessory device, and a display device 306. Like reference numerals denote like components, and description of like components will not be repeated here for sake of clarity. The other systems discussed herein, such as the system 300, may be referenced for such description.

The computer device 502 may include a processor 506, memory 508, an input/output (I/O) interface 510, a network interface 512, an input device 514, a display interface 516, and a display device 518. The processor 506 may be a CPU or other kind of processor, such as those discussed elsewhere herein. The memory 508 may be coupled to the processor 506 and may include a non-transitory machine-readable storage medium that may be any electronic, magnetic, optical, or other physical storage device that stores executable instructions. The machine-readable storage medium may include, for example, random-access memory (RAM), read-only memory (ROM), EEPROM, flash memory, a hard disk drive, a solid-state drive, an optical disc, and the like. The I/O interface 510 may include a northbridge, southbridge, a Peripheral Component Interconnect Express (PCIe) bus, a serial bus (e.g., a USB bus), or similar subsystem to mutually connect various components of the computer device 502. The network interface 512 may include an Ethernet interface, an Institute of Electrical and Electronics Engineers (IEEE) 802.11 wireless interface, or similar to connect the computer device 502 to a computer network. The input device 514 may include a keyboard, touchscreen, mouse, trackpad, or similar. The display device 518 may include a flat-panel display, a monitor, a screen, touchscreen, or similar. The display interface 516 may be coupled to the display device 518 and may include a display adaptor, a graphics controller, a graphics processor, graphics memory, or similar.

The memory 508 may store an operating system 520 and applications 522 for execution by the processor 506. The memory 508 may further store host instructions 524 to update memory at the dock 504 with updated instructions 526, which may be stored at the memory 508. Updated instructions 526 may be provided to the computer device 502 via the network interface 512 to update memory at the dock 504 during a remote update process. The remote update process may include another computer device, such as a server that connects with the computer device 502 via a computer network.

The dock 504 may include a microcontroller 206, a processor 102, a data port 106, a bus 208, memory 210, and a video port 304. The dock 504 may implement a display device adaptor or hub. The dock 504 may include a dock housing 530 that physically contains the microcontroller 206, processor 102, and other components of the dock 504.

The computer device 502 may connect to the dock 504 via a data channel 112 and a side channel 216. The channels 112, 216 may include mechanical connectors, ports, receptacles, or similar structure at the housing 530 that allow the computer device 502 to be set upon and lifted off the dock 504 to support the computer device 502 and to make and break the data connectivity of the channels 112, 216. The data channel 112 may include complementary video data connectors at the computer device 502 and the dock 504. The side channel 216 may include complementary bus connectors, such as USB connectors, at the computer device 502 and the dock 504. The video port 304 of the dock 504 is to connect to a display device 306, such as a monitor, projector, or the like and may provide display area in addition to that provided by the display device 518 of the computer device 502.

The processor 102 of the dock 504 is to control data communication between the data port 106 and the video port 304, which may be facilitated by the operational instructions 212 stored in the memory 210. When a computer device 502 and display device 306 are connected to the dock 504, the display interface 516 of the computer device 502 may display output of the computer device 502 at the display device 306 via the video data pathway provided by the dock.

The processor 102 of the dock 504 is responsive to mode-switching logic to switch to the low-power mode when the video port 304 is not connected to the display device 306. The processor 102 is responsive to a signal at the bus 208 to switch from the low-power mode to the operational mode, irrespective of any mode-switching logic, so that operational instructions 212 in the memory 210 of the dock 504 may be updated by the computer device 502 with updated instructions 526 provided by the computer device 502. Such updated instructions 526 may originate from remote computer device, such as a server, and may be communicated to the computer device 502 via the network interface 512, so that the computer device 502 may update the operational instructions 212 of the dock 504 when connected to the dock 504.

Other functionality of the dock 504 may operate in a respective operational mode regardless of the mode of the processor 102 with respect to the data port 106 and the video port 304. That is, the dock 504 may provide input device functionality, battery charging functionality, or other functionality to the computer device 502, and such functionality may be operable irrespective of whether a display device 306 is connected to the video port 304 or not.

The host instructions 524 at the host computer device 502 may be to initiate installation of the updated instructions 526 to the dock 504. The host instructions 524 may be provided to the computer device 502 by a remote server via a computer network and the network interface 512. The host instructions 524 may be provided to the computer device 502 during a remote update process.

The host instructions 524, when executed by the processor 506 of the computer device 502, may be to trigger output of a signal by the computer device to the dock 504 to trigger the dock 504 to exit the low-power mode. The signal may be provided to the dock 504 via the side channel 216. The microcontroller 206 at the dock 504 may interpret the signal and provide the signal, or a representation thereof, to the processor 102 to exit the low-power mode.

The host instructions 524 may further be to initiate communication of the updated instructions 526 from the computer device 502 to the dock after triggering output of the trigger signal at the side channel 216. The updated instructions 526 may be communicated from the computer device 502 to the dock 504 via the data channel 112, which in this example includes a video data bus provided by the display interface 516 of the computer device 502 and the data port 106 of the dock 504.

The host instructions 524 may be to trigger the computer device 502 to communicate the updated instructions 526 to the dock 504 in response to an acknowledgement of the signal. The acknowledgement may be provided by the dock 504 to the computer device 502 to acknowledge reception of the trigger signal via the side channel 216 and exit of the low-power mode. An acknowledgement signal may be communicated from the dock 504 to the computer device 502 via the side channel 216.

The host instructions 524 may be to trigger the computer device 502 to communicate the updated instructions 526 to the dock 504 after a duration after output of the trigger signal from the computer device 502 to the dock 504. That is, it may be presumed that the trigger signal was received by the dock 504 and that the low-power mode was exited after a specific duration has elapsed.

The side channel 216 over which the triggering signal is communicated may be a USB connection and the data channel 112 over which the updated instructions 526 are communicated may include a DisplayPort AUX channel.

Figure 6:
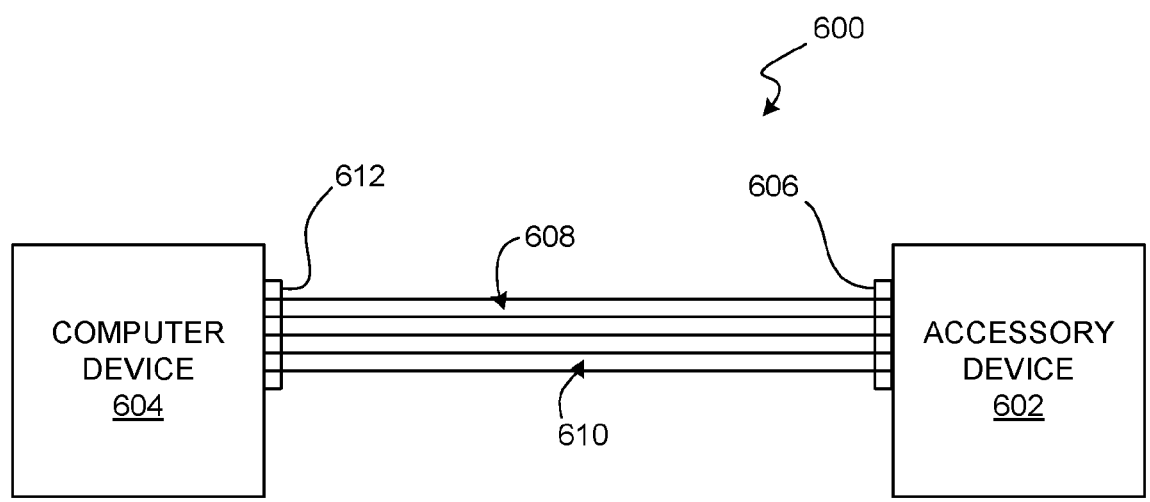
FIG. 6 is a block diagram of an example system including an example accessory device having an example data channel and an example side channel at the same port.

FIG. 6 shows an example system 600 that includes an accessory device 602 connected to a computer device 604. The description for any of the devices and systems described elsewhere herein may be referenced for further description that is not repeated here.

The accessory device 602 includes a common port 606 that includes separate conductors. The separate conductors include conductors 608 of a data channel and conductors 610 of a side channel. The data channel and side channel may be as described elsewhere herein. The computer device 604 may include a common port 612 that is complementary to the port 606 of the accessory device 602. The data channel and side channel may be physically provided together while providing separate functionality.

The accessory device 602 may be a powered USB hub, for example, having a low-power mode. The conductors 608 of the data channel may be USB data conductors and the conductors 610 of the side channel may be power delivery conductors. The side channel may be within the same cable as the data channel.

A signal transmitted by the computer device 604 on the conductors 610 of the side channel may be used to trigger the accessory device 602 to exit a low-power mode, so that updated instructions may be communicated over the conductors 608 of the data channel.

As described above, an accessory device may be triggered to exit a low-power mode, so that instructions at the accessory device may be updated. This may facilitate remote update of the accessory device and a user need not attend the location of the accessory device at time of update.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
a data port to provide a data channel to a host that is separate from the device;
a second port to connect to an external device;
a processor coupled to the data port and the second port, the processor including an operational mode and a low-power mode in which the processor is to perform fewer operations than in the operational mode, the processor to execute instructions in the operational mode and to update the instructions with updated instructions received via the data channel in the operational mode, the processor to switch to the low-power mode when the second port is unconnected to the external device; and
a side channel to receive a signal from the host to trigger the processor to switch from the low-power mode to the operational mode and to initiate update of the instructions with the updated instructions, while the second port is unconnected.

2. The device of claim 1, wherein the second port is a video port, the processor to control data communication between the data port and the video port, the processor further to switch to the low-power mode when the video port is not connected to a display device.

3. The device of claim 1, wherein the device is a display device hub.

4. The device of claim 1, wherein the data channel and the side channel comprise separate conductors within a common port.

5. The device of claim 1, wherein the data channel and the side channel comprise separate conductors at separate ports.

6. The device of claim 1, further comprising a microcontroller coupled to the processor, the microcontroller in the side channel to receive the signal and trigger the processor to exit the low-power mode.

7. The device of claim 6, further comprising a dock housing containing the processor and the microcontroller.

8. A device comprising:
a data port to provide a data channel to a host;
a plurality of video ports to connect to a plurality of display devices;
a processor coupled to the data port and the plurality of video ports, the processor to execute instructions and to update the instructions with updated instructions received via the data channel, the processor including a low-power mode in which the instructions are immutable, the processor to switch to the low-power mode when the plurality of video ports is unconnected; and a side channel to receive a signal from the host to trigger the processor to exit the low-power mode while the plurality of video ports is unconnected to allow update of the instructions with the updated instructions.

9. The device of claim 8, wherein the data channel of the data port includes a video data bus to communicate video data and an auxiliary channel.

10. The device of claim 9, wherein the updated instructions are to be received via the auxiliary channel.

11. The device of claim 8, further comprising electrically-erasable programmable read-only memory to store the instructions.

12. The device of claim 8, further comprising a microcontroller coupled to the processor, the microcontroller in the side channel to receive the signal and trigger the processor to exit the low-power mode.

13. A non-transitory machine-readable storage medium comprising host instructions that, when executed by a processor of a computer device, trigger output of a signal by the computer device to an accessory device connected to the computer device, wherein the accessory device is connectable to an external device and is to operate in a low-power mode when unconnected to the external device, the signal to trigger the accessory device to exit the low-power mode when unconnected to the external device, and the host instructions further to communicate updated instructions from the computer device to the accessory device after triggering output of the signal.

14. The non-transitory machine-readable storage medium of claim 13, wherein the host instructions are to trigger the computer device to communicate the updated instructions to the accessory device in response to an acknowledgement of the signal received from the accessory device.

15. The non-transitory machine-readable storage medium of claim 13, wherein the host instructions are to trigger the computer device to communicate the updated instructions to the accessory device after a duration after output of the signal.

* * * * *